(12) United States Patent
Gettemy et al.

(10) Patent No.: US 8,325,309 B2
(45) Date of Patent: Dec. 4, 2012

(54) DISPLAY HAVING A PLURALITY OF DRIVER INTEGRATED CIRCUITS

(75) Inventors: Shawn R. Gettemy, San Jose, CA (US); Carlin J. Vieri, Redwood City, CA (US); Yongman Lee, Pleasanton, CA (US); Wei H. Yao, Fremont, CA (US)

(73) Assignee: Apple Inc., Cupertino, CA (US)

( * ) Notice: Subject to any disclaimer, the term of this patent is extended or adjusted under 35 U.S.C. 154(b) by 927 days.

(21) Appl. No.: 12/236,066

(22) Filed: Sep. 23, 2008

(65) Prior Publication Data

US 2010/0073332 A1    Mar. 25, 2010

(51) Int. Cl.
G02F 1/1345    (2006.01)
(52) U.S. Cl. .................................. 349/149; 349/152
(58) Field of Classification Search ........... 349/149–152
See application file for complete search history.

(56) References Cited

U.S. PATENT DOCUMENTS

| | | | |
|---|---|---|---|
| 5,436,745 A | | 7/1995 | Voisin et al. |
| 6,937,216 B1 * | | 8/2005 | Ishiyama ................. 345/87 |
| 7,375,787 B2 * | | 5/2008 | Cheng et al. ............... 349/151 |
| 2002/0072141 A1 | | 6/2002 | Nakashima et al. |
| 2002/0158859 A1 | | 10/2002 | Nakano et al. |
| 2005/0168491 A1 | | 8/2005 | Takahara et al. |
| 2006/0103641 A1 | | 5/2006 | Marhefka |
| 2007/0247582 A1 | | 10/2007 | Mochizuki |
| 2007/0257890 A1 | | 11/2007 | Hotelling et al. |
| 2008/0130867 A1 | | 6/2008 | Bowen |
| 2008/0143660 A1 * | | 6/2008 | Itou ................................. 345/87 |
| 2008/0158177 A1 | | 7/2008 | Wilson et al. |
| 2008/0211985 A1 | | 9/2008 | Igarashi et al. |

FOREIGN PATENT DOCUMENTS

| | | |
|---|---|---|
| EP | 1909132 A | 4/2008 |
| JP | 2007142387 A | 6/2007 |
| WO | 2006121914 A2 | 11/2006 |

OTHER PUBLICATIONS

Susumu Nakakarumai, General Manager Display Systems Division; NEC Electronics LCD Driver IC Technology for Next-Generation Large-Screen LCD TVs; vol. 61, Dec. 1, 2006.

* cited by examiner

*Primary Examiner* — Dung T. Nguyen
(74) *Attorney, Agent, or Firm* — Fletcher Yoder PC

(57) ABSTRACT

An electronic device is disclosed. In some embodiments, the electronic device includes a liquid-crystal display (LCD) and a plurality of driver integrated circuits (ICs) coupled to the LCD. The driver ICs may be disposed near non-central locations along a side of the LCD, and in some embodiments, one of the driver ICs may be a master driver IC and the other driver IC or driver ICs may be slave driver ICs.

15 Claims, 6 Drawing Sheets

DISPLAY HAVING A PLURALITY OF DRIVER INTEGRATED CIRCUITS

BACKGROUND OF THE INVENTION

1. Field of the Invention

The present invention relates generally to displays and, in some embodiments, to displays having a plurality of integrated circuits.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Liquid-crystal displays (LCDs) are used in a variety of electronic devices, such as televisions, computer monitors for desktop and laptop computers, and specialized equipment like automated teller machines, medical devices, and industrial equipment. LCD panels are also frequently used in portable electronic devices, such as cell phones, global-positioning-satellite (GPS) units, and hand-held media players.

Typically, LCDs include an array of pixels for displaying images. The pixels often each include three or more sub-pixels each for displaying a color, e.g., red, blue, green, and in some instances, white light. To display an image, the appropriate sub-pixels on the display are rendered transmissive to light, allowing color-filtered light to pass through each of the transmissive sub-pixels and form an image.

Before image data is rendered by an LCD, the data is often passed through a driver integrated circuit (driver IC). Image data often includes pixel locations and pixel intensities. Driver ICs receive image data from other portions of the electronic device, such as a graphics card or graphics controller. Based on the received data, the driver ICs output control signals that change the transmissive state of the appropriate sub-pixels. Often, the signals that convey the image data to the driver IC are weaker (e.g., lower voltage or lower current) than the control signals. The driver ICs often include circuitry to boost the signal strength of the image data and, in some instances, circuitry to convert digital image data signals to analog control signals. Additionally, driver ICs often route image data to the appropriate rows and columns of sub-pixels. The driver ICs interpret the pixel locations and route the pixel intensities to the appropriate rows and columns.

Driver ICs often occupy space around an LCD panel that could be put to other uses. Frequently, driver ICs are disposed near the middle of the edges of LCD panels. This is done to reduce the distance that signals travel from the driver ICs to each side of the LCD panel, but as a result, space that might otherwise be used for other components of the electronic device is occupied by driver ICs. In particular, it is often desirable to position certain sensors, buttons, speakers, or other components near the middle of the edge of LCDs, but disadvantageously driver ICs often consume this area.

Shifting the position of driver ICs is complicated by the deterioration of control signals over a distance. A driver IC disposed to one side of an LCD's edge, e.g., near a corner, may transmit signals to pixels near the other side of the LCD. These signals may travel over a longer distance than those from a centrally disposed LCD. The signals may deteriorate over the longer distance due to resistance, capacitive coupling, and inductive coupling. This effect may be particularly prevalent in amorphous silicon LCDs, which may be less expensive to manufacture, but include may include increased numbers of lines between the driver IC and pixels, and increased space needed for routing, when compared to other types of higher cost LCDs.

BRIEF SUMMARY

Systems, methods, and devices are disclosed, including a device having a liquid-crystal display (LCD) panel that includes a plurality of driver ICs. The driver ICs may be mounted along a side of the LCD panel near non-central portions of the side. In some embodiments, the driver ICs have a master-slave relationship with one of the driver ICs distributing power and data to the other driver IC or driver ICs.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
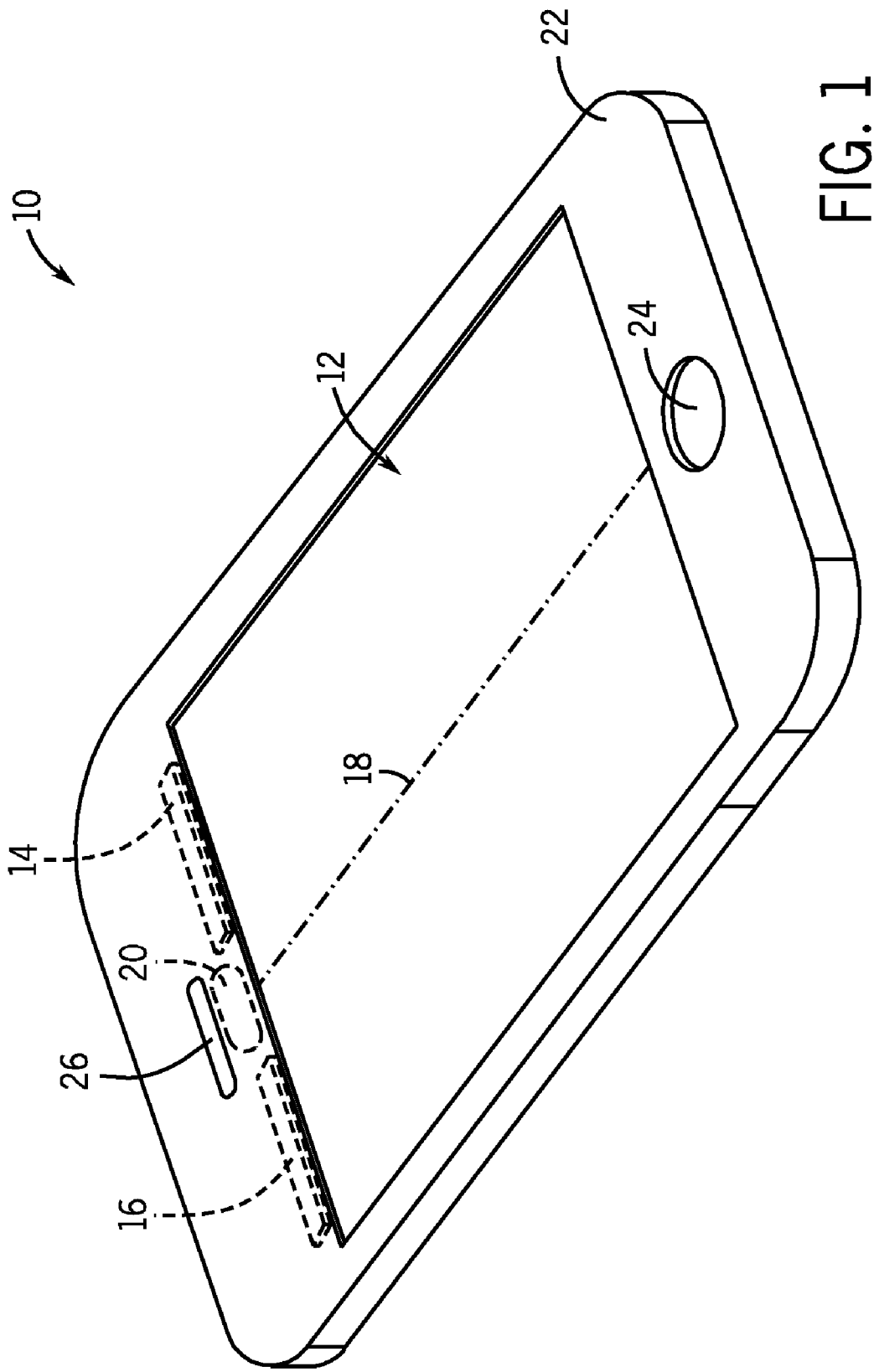
FIG. 1 illustrates an electronic device in accordance with an embodiment of the present technique.

FIG. 1 illustrates an embodiment of an electronic device 10 having an LCD 12 including two driver ICs 14 and 16. The two driver ICs 14 and 16 may be spaced away from a longitudinal central axis 18 of the LCD 12. As a result, in some embodiments, an area 20 between the driver ICs 14 and 16 may be occupied by other components of the electronic device 10, such as a button, a speaker, a microphone, a camera, or other electronic component. Further, because the driver ICs 14 and 16 are positioned closer to the portions of the LCD that they service, the driver ICs may transmit signals to portions of the LCD over relatively short distances relative to a single driver IC. The driver ICs 14 and 16 and the LCD 12 are described in detail below, after describing other aspects of the electronic device 10.

The illustrated electronic device 10 may be a hand-held electronic device, such as a personal media player, a cellular telephone (e.g., a "smart phone"), a GPS unit, a handheld gaming device, a personal digital assistant, or a combination thereof (which is not to suggest that the term "or" is used herein to refer to exclusive alternatives, unless otherwise indicated). Other examples of electronic devices and other systems that may include the LCD 12 are described below with reference to FIG. 6.

The electronic device 10 may include a body 22, a power button 24, and a speaker 26. The body 22 may be made of metal, plastic, or other appropriate materials. The body 22 may generally shield the interior of the electronic device 10 from electromagnetic noise, moisture, and mechanical contact. The power button 24 may be generally centrally located along the longitudinal central axis 18 along with the speaker 26. The electronic device 10 may include ports (not shown) for coupling the electronic device 10 to a power supply, a SIM card, a memory card, or other inputs. Additionally, the electronic device 10 may include various interfaces for receiving input from a user, interfaces such as a transparent touch screen (e.g., a mutual capacitance multi-touch sensor) disposed adjacent the LCD 12, a keypad, an accelerometer, an image sensor, or a microphone.

Figure 2:
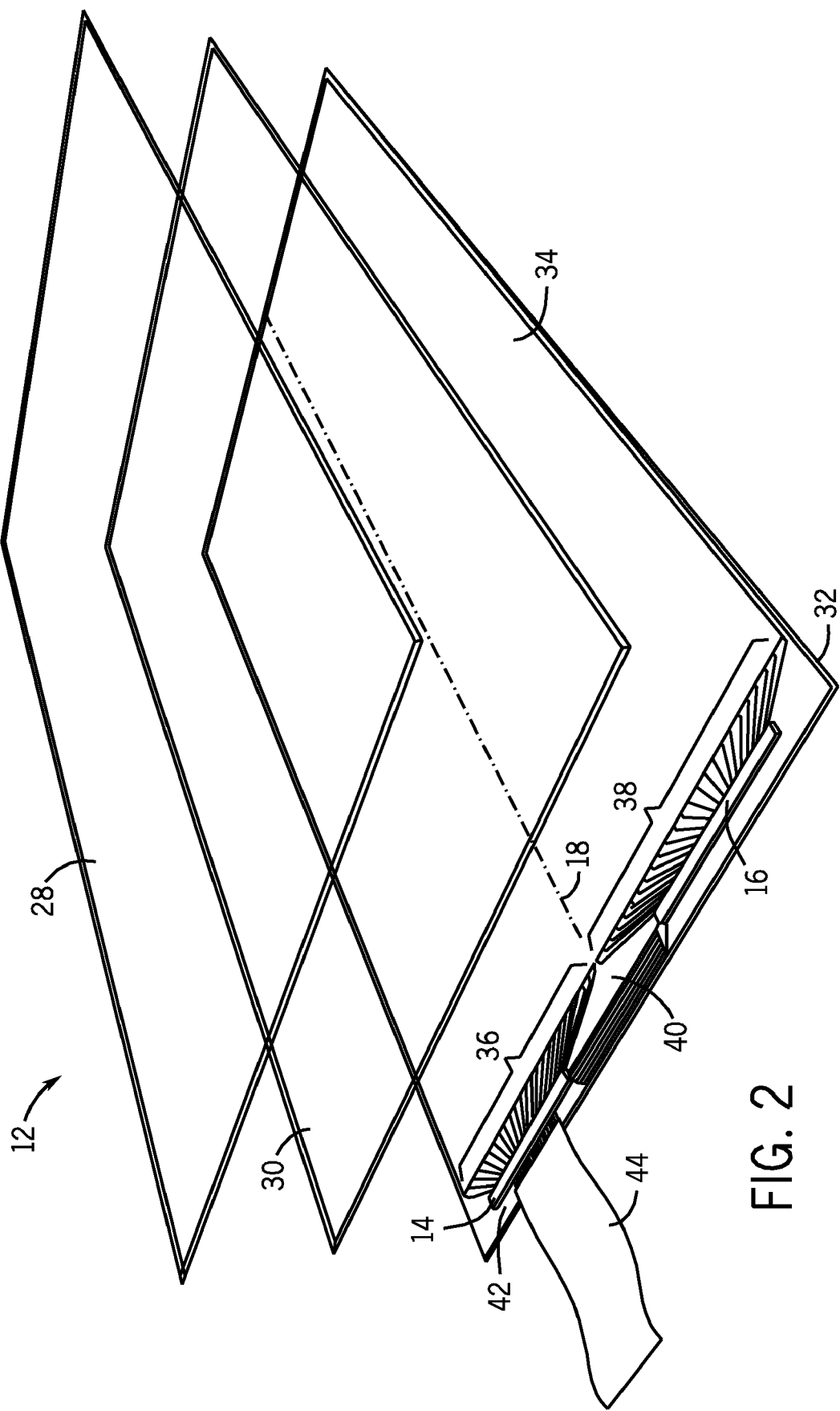
FIG. 2 illustrates an LCD in accordance with an embodiment of the present technique.

FIG. 2 illustrates additional details of the LCD 12. The LCD 12 may be any of a variety of types of LCDs, including a twisted nematic (TN) panel, an in-plane switching (IPS) panel, a multi-domain vertical alignment (MVA) panel, a patterned vertical alignment (PVA) panel, or a super patterned vertical alignment (S-PVA) panel, for example. In other embodiments, other types of displays may be used, such as a plasma display, an organic light emitting diode display, an electronic ink display, or other displays having drivers.

The LCD 12 may include a polarizer 28, a color filter 30 and a substrate 32. The polarizer 28 may be disposed above the color filter 30 and may be configured to selectively transmit light having a particular orientation. The color filter 30 may be made of glass or other appropriate materials, e.g., translucent or transparent plastic. The color filter 30 may include a patterned matrix of color filters arrayed according to the position of sub-pixels on the LCD 12 (examples of which are described below with reference to FIG. 5). For example, the color filter 30 may include a plurality of pixel color filters each having a region that transmits red light and obstructs other frequencies, a region that transmits green light and obstructs other frequencies, and a region that transmits blue light and obstructs other frequencies.

The substrate 32 may include a pixel array 34, first and second groups of fanout traces 36 and 38, inter-driver bus traces 40, input traces 42, and a flex cable 44. The first group of fanout traces 36 may connect the driver IC 14 to column lines in the left half of the pixel array 34, and the second group of fanout traces 38 may connect the driver IC 16 to column lines in the right half of the pixel array 34. The inter-driver bus traces 40 may connect the driver IC 14 to the driver IC 16, and the input traces 42 may connect the flex cable 44 to the driver IC 14.

Some or all of the fanout traces 36 and 38, the inter-driver bus traces 40, and the input traces 42 may be integrally formed on the substrate 32 along with the features of the pixel array 34. For instance, these features 36, 38, 40, and 42 may be formed with semiconductor processing steps, e.g., by thin-film deposition of conductive materials followed by photolithographic patterning and etching. In some embodiments, the illustrated features 36, 38, 40, and 42 are formed from a conductive metal film that is deposited on the substrate 32 and selectively etched to form the features 36, 38, 40, and 42, or the features 36, 38, 40, and 42 may be formed from doped semiconductive materials, such as doped amorphous silicon or doped low-temperature polysilicon.

The features 36, 38, 40, and 42 may be formed concurrent with portions of the pixel array 34. The pixel array 34 may include a plurality of transistors formed from semiconductive materials, such as amorphous silicon or low-temperature polysilicon. Connections between the transistors may be formed from the same conductive film used to form the traces 36, 38, 40, and 42. Examples of the transistors and other features of the pixel array are described below with reference to FIG. 5.

The driver ICs 14 and 16 may be connected to the traces 36, 38, 40, and 42 through a ball grid array, wire bonding, wave soldering or other techniques known in the art. In some embodiments, the driver ICs 14 and 16 may be mounted directly to the LCD 12, without an intervening flex tape, or they may be coupled to the LCD 12 with a flex tape or other intervening structure. The flex cable 44 may connect the LCD 12 to other portions of the electronic device 10 (FIG. 1) and convey image data and power to the LCD 12.

While the driver ICs 14 and 16 may be generally similar or identical to each other, in some embodiments, they may have different roles. For example, the driver IC 14 may function as a master driver IC, and the driver IC 16 may function as a slave driver IC. The term "master driver IC" refers to a driver IC that distributes data to other driver ICs, and the term "slave driver IC" refers to driver ICs that receive that data. Commands, image data, and power intended for the driver IC 16 may be transmitted from or through the driver IC 14 by way of the inter-driver bus traces 40.

Each of the driver ICs 14 and 16 may drive (e.g., modulate the transmissive state of) a plurality of pixels. In some embodiments, the pixel array 34 may include about 480 columns of pixels and about 720 rows of pixels. The columns may extend generally parallel to the longitudinal central axis 18, and the rows may extend generally perpendicular to the longitudinal central axis 18. Each driver IC 14 and 16 may drive about 240 columns of pixels, with each column of pixels having about three columns of sub-pixels. Each of the fanout traces 36 and 38 may drive one column of sub-pixels, or in some embodiments, the fanout traces 36 and 38 may each be connected to three columns of sub-pixels through a 1 to 3 multiplexer.

The inter-driver bus traces 40 may convey image data, power, and commands from the master driver IC 14 to the slave driver IC 16. The inter-driver bus traces 40 may carry analog signals (e.g., voltage or current signals) that are representative of image data. Or, in some embodiments, the inter-driver bus traces 40 may carry digital signals that are converted to analog signals by the driver IC 16.

Figure 3:
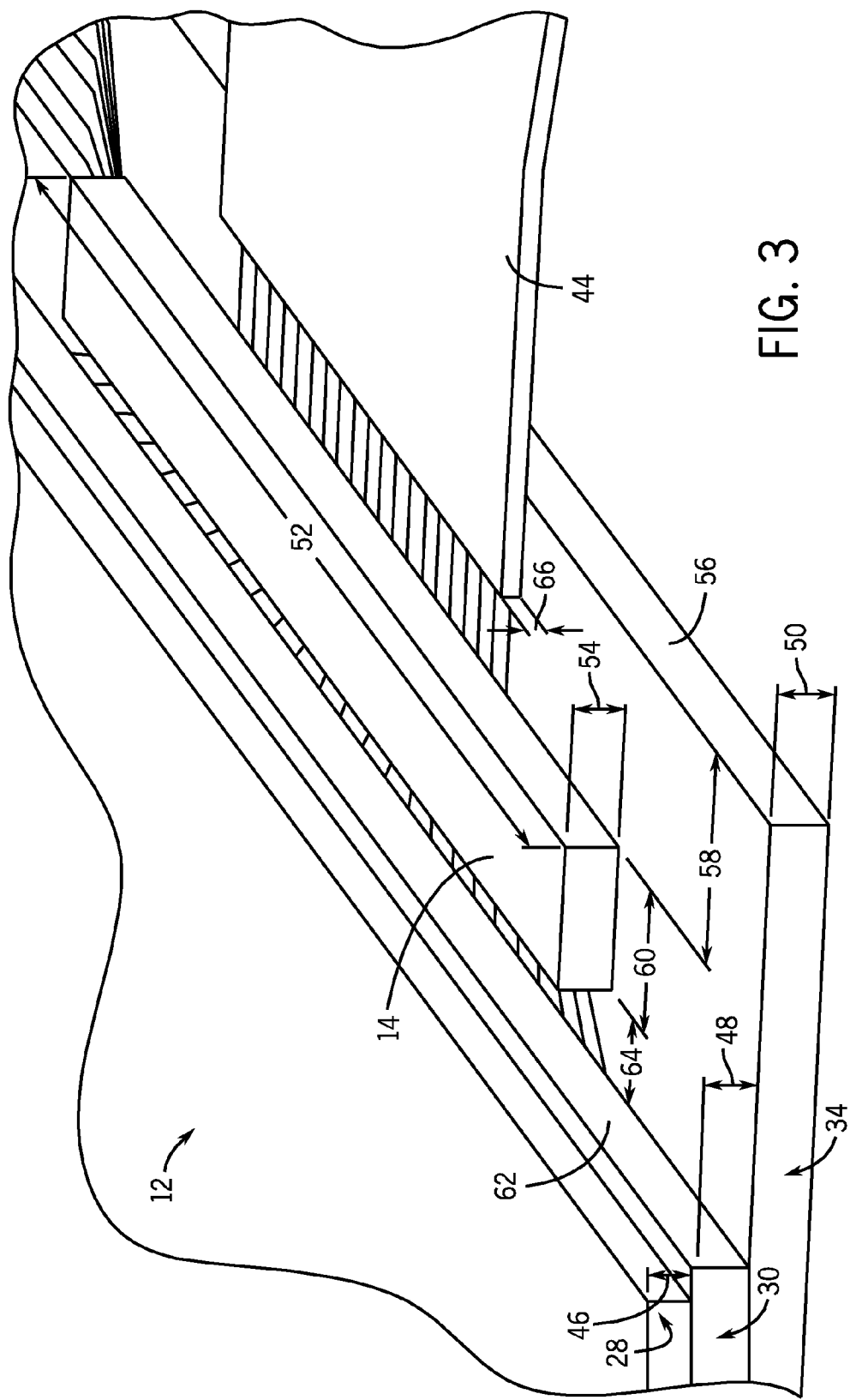
FIG. 3 illustrates additional details of the LCD of FIG. 2.

The FIG. 3 illustrates additional details of the LCD 12 including certain dimensions. The polarizer 28 may have a thickness 46 of less than about 0.5 mm, e.g., between about 0.08 mm and about 0.25 mm. The color filter 30 may have a thickness 48 of less than about 0.5 mm, e.g., between about 0.1 mm and about 0.3 mm. The substrate 34 may have a thickness 50 of less than about 0.5 mm, e.g., between about 0.1 mm and about 0.3 mm. The driver ICs 14 (FIG. 3) and 16 (FIG. 2) may have a width 52 of less than about 25 mm, e.g., between about 12 mm and about 14 mm, and a height 54 of less than about 0.5 mm, e.g., between about 0.1 and about 0.4 mm. The driver ICs 14 and 16 may be spaced away from a top edge 56 of the substrate 34 by a distance 58 that is less than about 2 mm, e.g., between about 0.8 and about 1.5 mm, or about 1.2 mm. The driver ICs 14 and 16 may have a width 60 that is less than about 1.5 mm, e.g., between about 0.5 and about 0.1 mm, or about 0.8 mm. The driver ICs 14 and 16 may be spaced away from a top edge 62 of the color filter 30 by a distance 64 of less than about 1 mm, e.g., between about 0.3 and about 0.7 mm, or about 0.5 mm. The pixel matrix 34 may be spaced less than about 3 mm from the edge 62, e.g., between about 1 and about 3 mm, or between about 1.7 mm and about 2 mm. The flex cable 44 may have a thickness 66 that is less than about 0.3 mm, e.g., about 0.1 mm. The distance between the driver ICs 14 and 16 may be greater than about 5 mm, e.g., between about 10 mm and about 14 mm or between about 11 mm and about 13 mm.

Figure 4:
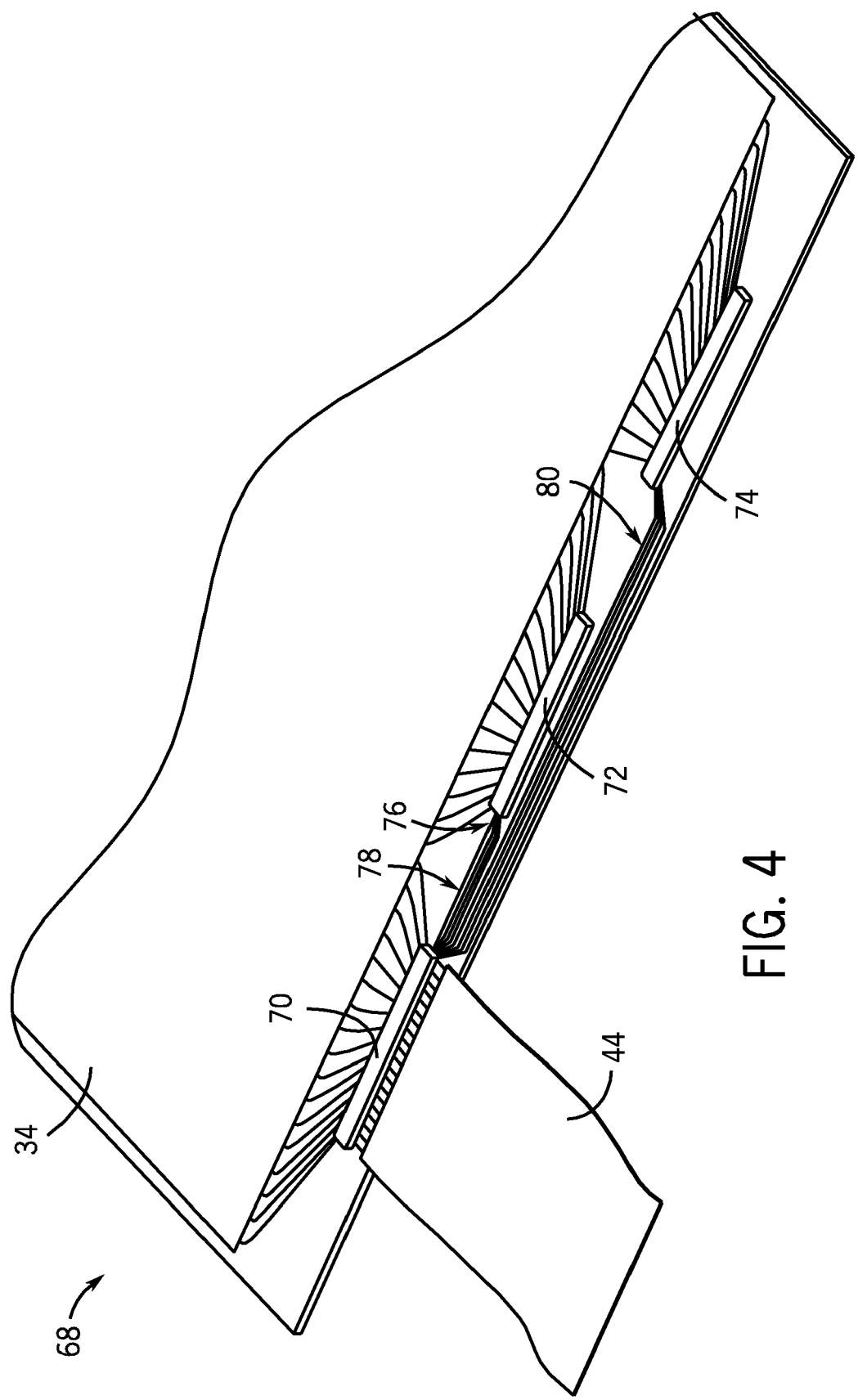
FIG. 4 illustrates an LCD in accordance with another embodiment of the present technique.

FIG. 4 illustrates another embodiment of an LCD 68. The illustrated LCD 68 may include three driver ICs 70, 72, and 74. The driver IC 70 may be characterized as the master driver IC, and the driver ICs 72 and 74 may be characterized as slave driver ICs. In this embodiment, a first portion 76 of an inter-driver bus 78 couples to the driver IC 72 and a second portion 80 of the inter-driver bus 78 couples to the other driver IC 74. In other embodiments, all of the traces in the inter-driver bus 78 may couple to both of the driver ICs 72 and 74, and data directed toward each of the driver ICs 72 or 74 may be multiplexed or otherwise addressed to each of the driver ICs 72 and 74. Other embodiments may include additional driver ICs, e.g., more than three, more than four, more than six, or more than eight. The driver ICs 70, 72, and 74 may be closer to the pixels that they control relative to embodiments with fewer driver ICs, and this shorter distance may reduce signal attenuation. Further, any space between the driver ICs 70, 72, and 74 may be advantageously utilized for additional components or features.

Figure 5:
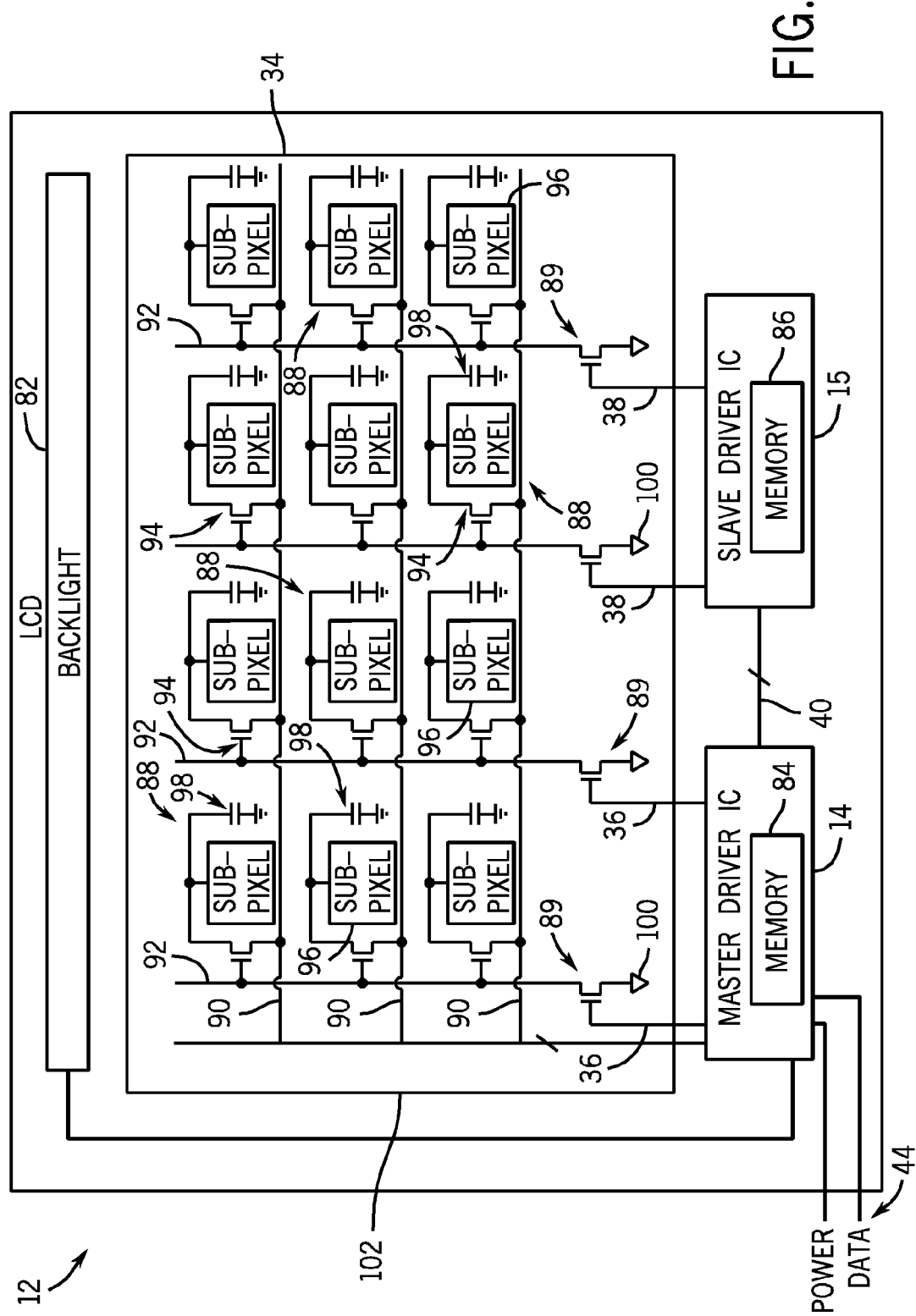
FIG. 5 is a schematic representation of an LCD in accordance with an embodiment of the present technique.

FIG. 5 is a schematic representation of the LCD 12 illustrating additional details. In addition to the previously described components 14, 16, 34, 40, and 44, the LCD 12 may include a backlight 82 and memory 84 and 86 in the driver ICs 14 and 16.

The LCD 12 may include a plurality of devices that are formed on the substrate 32 (FIG. 2), e.g., a glass substrate, including pixel array 34. The illustrated pixel array 34 may include a plurality of sub-pixels 88, and a plurality of gate-line transistors 89, all formed on the substrate 32 (FIG. 2). The illustrated sub-pixels 88 may be generally arranged in rows and columns with each sub-pixel 88 in a row coupled to a source line 90 and each sub-pixel 88 in a column coupled to a gate line 92. The illustrated sub-pixels 88 are generally arranged in a rectangular lattice, but in other embodiments they may be arranged differently, e.g., in a hexagonal lattice.

Each of the illustrated sub-pixels 88 may include an access transistor 94, a light switch 96, and a capacitor 98. The access transistors 94 may be formed on the substrate 32 (FIG. 2) by depositing a semiconductor, such as amorphous silicon or polycrystalline silicon, on the substrate 32 (FIG. 2) and patterning the semiconductive material with lithography, e.g., photolithography. The semiconductive material may be selectively doped to form a source, a drain, and a channel in each of the access transistors 94, and an insulator, such as silicon dioxide, and a conductive material may be patterned on the substrate 32 (FIG. 2) to form a gate adjacent the channel in each of the access transistors 94. The light switch 96 may include a liquid crystal disposed between two conductive transparent or translucent electrodes and two generally orthogonally-oriented light-polarizing layers. Biasing the electrodes may orient the liquid crystal such that light may be selectively transmitted through the light-polarizing layer 28 (FIG. 2) according to the electrical state of the electrodes. The color filter 30 (FIG. 2) may include colored translucent regions disposed across each sub-pixel 88 to selectively transmit a particular frequency of light, e.g., red, blue, or green, such that applying a voltage to the sub-pixel 88 renders the sub-pixels 88 generally transparent or translucent to certain frequencies of light. The capacitor 98 may include a plate coupled to one of the electrodes in the sub-pixel 88 and another plate coupled to a common voltage source, e.g. ground, or an adjacent gate line 92. The capacitor 98 may generally maintain a voltage across the electrodes in the sub-pixel 88 when the sub-pixel 88 is not being addressed.

The gates of each of the access transistors 94 may be connected to one of the gate lines 92, which may be generally integrally formed with the gate of the access transistors 94, or it may be formed in a different step. The illustrated gate lines 92 couple to a plurality of sub-pixels 88 disposed in a given column. In some embodiments, the gate lines 92 are coupled at one end to a load circuit that tends to render the access transistors 94 conductive and at the other end to a pull-down voltage source 100 that tends to render the access transistors 94 nonconductive. The source and drain of the illustrated gate-line transistors 89 may be coupled in series between the pull-down voltage source 100 and the gate lines 92, such that the gate-line transistors 89 control whether the access transistors 94 on a given gate line 92 are conductive or nonconductive. A gate of each of the gate-line transistors 89 may be coupled to one of the driver ICs 14 or 16.

The sources of the access transistors 94 on a given row may be connected to a source line 90, which like the other features on the substrate 16, may be formed by deposition, lithography, and etching. The source lines 90 may connect to the driver IC 14 through a source-line bus 102. Image data, such as the degree to which a given light switch 96 in a given sub-pixel 88 should transmit light, may be transmitted from the driver IC 14 to the sub-pixels 88 via the source-line bus 102 and the appropriate source line 90. The image data may be in the form of a voltage that when formed across the electrodes in one of the light switches 96, allows the appropriate amount of light through the light switch 96.

The backlight 82 may be configured to supply light to one side of the sub-pixels 88. In some embodiments, the backlight 82 includes one or more fluorescent lights or one or more light-emitting diodes, e.g. white-light emitting diodes. A light-guide and a reflective layer may distribute light from the backlight 82 generally evenly among the sub-pixels 88, which may selectively transmit this light. In some embodiments, the sub-pixels 88 are transflective sub-pixels that have a reflective portion that selectively reflects ambient light and a transmissive portion that selectively transmits light from the backlight 82.

The driver ICs 14 and 16 may each include memory 84 or 86. The memory 84 and 86 may be non-volatile in order to store configuration settings for the LCD 12. For example, the memory 84 and 86 may store gamma levels or other image parameters and panel calibrations. The configuration settings in the memory 84 and the memory 86 may be used to tune the driver ICs 14 and 16 so that the sub-pixels 88 that they control output generally similar light intensities in response to generally similar image data. Values in the memory 84 and 86 may be used to match the performance of the driver ICs 14 and 16.

As illustrated by FIG. 5, the driver IC 14 communicates with the driver IC 16 through the inter-driver bus traces 40. To transmit signals on these traces 40, the driver IC 14 may include an output referred to as a "cascade output" that couples to the inter-driver bus traces 40, and the driver IC 16 may include an input referred to as a "cascade input" that couples to the other end of the inter-driver bus traces 40. In some embodiments, the driver ICs 14 and 16 may be generally similar or identical and may both have a cascade input on one side and a cascade output on the other side. The cascade input may remain unused on the master driver IC 14 and the cascade output may remain unused on the slave driver IC 16.

In operation, the driver ICs 14 and 16 receive image data and, based on this data, output signals that adjust the sub-pixels 88. The image data may be received from other components of an electronic device including the LCD 12. The image data may indicate which sub-pixels 88 should be rendered transmissive and the degree to which they should be rendered transmissive to form an image conveyed by the image data, such as a frame in a video. The image data and power may be delivered through the flex cable 44 to the master driver IC 14. The master driver IC 14 may then determine whether the image data addresses one of the sub-pixels 88 coupled to the master driver IC 14 or one of the sub-pixels 88 coupled to the slave driver IC 16. The data directed to the slave driver IC 16 may be routed along with electrical power through the inter-driver bus traces 40 to the slave driver IC 16. Prior to transmitting the image data to the appropriate sub-pixels 88, the driver ICs 14 and 16 may process the image data based on configuration values stored in the memory 84 or 86, e.g., by changing the gamma values of the image data to reduce artifacts from having separate driver ICs 14 and 16.

To display the image, the driver ICs 14 and 16 may generally individually access each column of sub-pixels 88 to which they are coupled and adjust the voltage across the electrodes in each of the light switches 96 in those sub-pixels 88. To access a column of sub-pixels 88, in this embodiment, the driver ICs 14 and 16 may turn off the gate-line transistor 89 associated with the column of sub-pixels 88 being addressed. Turning off the gate-line transistor 89 may impede or prevent the pull-down voltage source 100 from holding down the voltage of the gate line 92, and the voltage of the addressed gate line 92 may rise in response to the gate-line transistor 89 being turned off, as current flowing between the gate line 92 and a load circuit may increase the voltage of the gate line 92. This change in voltage may render the access transistors 94 on the addressed column conductive. Image data appropriate for the addressed column may be transmitted from the driver IC 14 to each of the source lines 90. The voltages of the source lines 90 may drive current between the source lines 90 and both the capacitor 98 and the electrodes in the light switches 96, thereby updating the light-conductive state of the light switches 96 according to the image data. After the sub-pixels 88 in a column are adjusted, the gate-line transistor 89 for that column may turn back on, and the pull-down voltage source 100 may lower the voltage of the gate line 92 and turn off the access transistors 94 on that column, thereby impeding the sub-pixels 88 from changing until the next time that they are addressed. The driver ICs 14 and 16 may repeat this process for each of the gate lines 92 to produce an image. In some embodiments, groups of sub-pixels 88 each having a filter of a different color may together form a single pixel of the resulting image.

Figure 6:
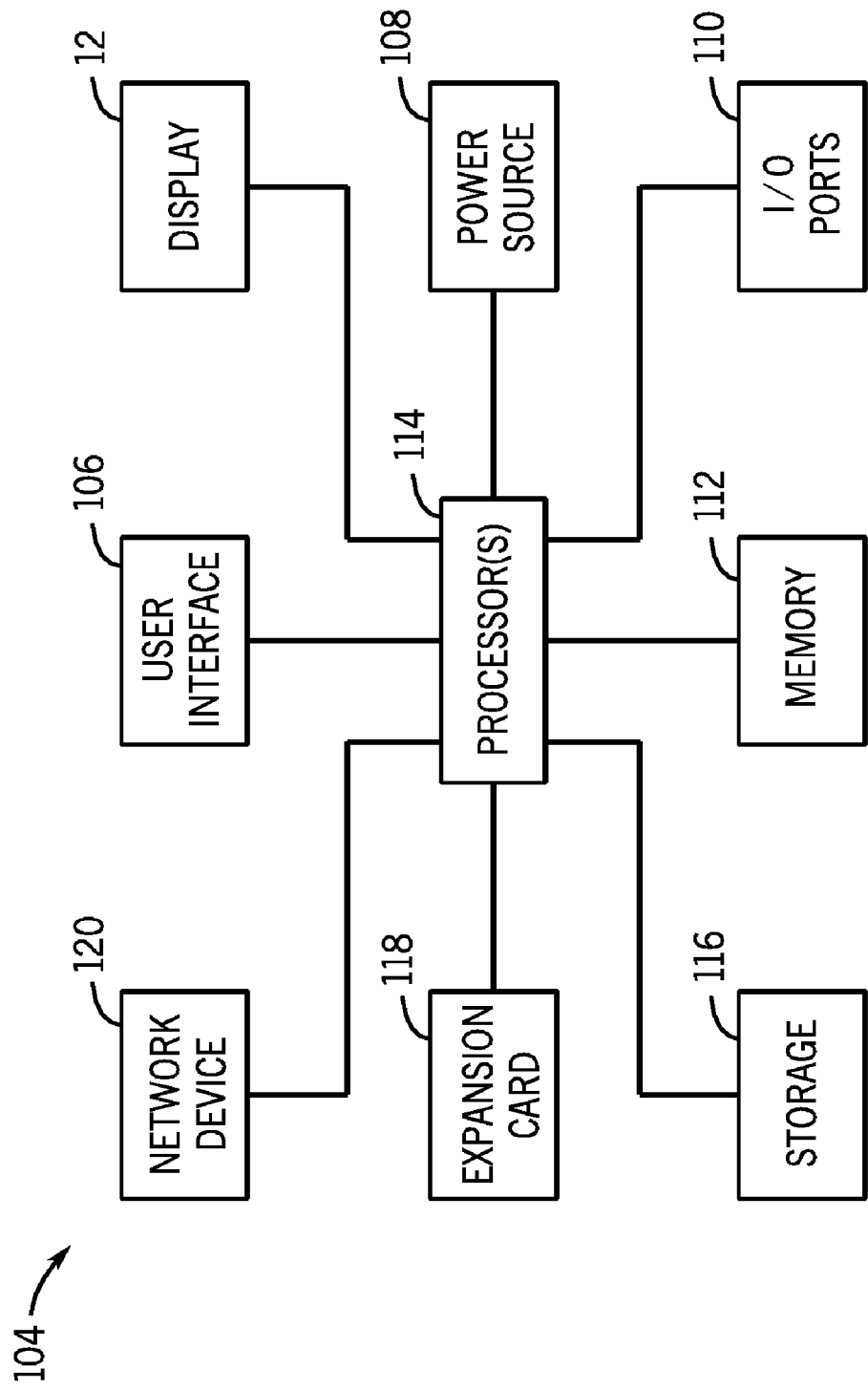
FIG. 6 illustrates a system in accordance with an embodiment of the present technique.

FIG. 6 illustrates an example of an electronic device 104 that may include the LCD 12 of FIG. 2 or the LCD 68 of FIG. 4, or variations thereof. The electronic device 104 may also include a user interface 106, a power source 108, input/output ports 110, memory 112, a processor 114, storage 116, an expansion card 118, and a network device 120.

The user interface 106 may include one of the user interfaces described above, such as a layer responsive to a contact from, or close proximity of, a finger or a stylus, such as a digitizer. In some embodiments, this layer may be responsive to multiple areas of contact, e.g., a multi-touch digitizer. Or, the user interface 106 may include a keypad (e.g. a slide-out keypad or a keyboard), a microphone, a camera, a stylus, or an accelerometer.

The power source 108 may include a portable power source, such as a lithium-ion battery, a nickel-metal-hydride battery, or a fuel cell. In some embodiments, the power source 108 may include a transformer configured to condition grid power for use by the electronic device 104.

The input/output ports 110 may include ports compliant with a variety of different communications standards. For example, the input/output ports 110 may include a universal serial bus (USB) port, a FireWire port, a serial port, a parallel port, a headphone port, a microphone port, a video graphics array port, a digital visual interface port, or various other ports.

The memory 112 may include solid state memory, such as a solid-state drive or ROM memory, or a disc drive. The memory 112 may store software for execution on the processor 114. For example, the memory 112 may store a basic input/output system (BIOS), an operating system and various applications, such as an office productivity suite, a browser, a media player, or an e-mail application. This software may be stored on a machine readable medium, such as one of those mentioned above.

The processor 114 may be configured to control the operation of the electronic device 104 by interfacing with each of its components 106, 12, 108, 110, 112, 116, 118, and 120. The processor 114 may be configured to execute the software stored in the memory 112 and coordinate movement of data through the electronic device 104.

The storage 116 may include volatile memory, such as dynamic random access memory (DRAM) or static random access memory (SRAM), or nonvolatile memory, such as NAND or NOR flash memory. In some embodiments, the storage 116 may include space on a hard drive or a solid-state drive or an optical media. In some embodiments, the storage 116 may include machine readable media storing music or video data, such as music or video data encoded in Advanced Audio Coding (AAC) or other compression format, such as MP3, MP4, OGG, WAV, FLAC, or Apple Lossless format.

The expansion card 118 may include a variety of types of expansion cards or slots for expansion cards. For example, the expansion card 118 may include memory or a slot for memory, such as solid state memory card. In some embodiments, the expansion card 118 may include a card or a slot for a card that adds functionality, such as a GPS unit, a cable card, or a data acquisition card.

The network device 120 may be a wired or wireless network device configured to transmit and receive data over a network, such as the Internet, a local area network, a wireless area network, a personal area network, or a sensor area network. In some embodiments, the network device 120 includes a wireless network device, such as a Bluetooth transceiver, a WiFi transceiver, a cellular data or voice signal transceiver, or an infrared transceiver. In some embodiments, the network device 120 includes a wired network device, such as an Ethernet card or modem.

Other embodiments may include other types of electronic devices 104. In some embodiments, the electronic device 104 may include a GPS module, and the memory 112 may store maps for displaying GPS position data on the LCD 12. The electronic device 104 may also be one of a variety of types of displays, such as a television, a dynamically updated photo frame, a monitor of a laptop, palmtop, or desktop computer, or one of a variety of types of equipment, such as an automated teller machine, a point-of-sale terminal, a medical device, or a manufacturing device. In some embodiments, the electronic device 104 is a hand-held gaming device, and the memory 112 stores one or more video games. The electronic device may also be a display module in a vehicle that displays information about the state of the vehicle, e.g., position, velocity, or an image from a vehicle-mounted camera.

What is claimed is:

1. A device, comprising:
    a liquid-crystal display (LCD);
    a first driver integrated circuit (IC) coupled to the LCD and disposed near a side of the LCD and near a non-central portion of the side;
    a second driver IC coupled to the LCD and disposed at a second non-central location along the side of the LCD; and
    a user interface device disposed between the first driver IC and the second driver IC.

2. The device of claim 1, wherein a distance between the first driver IC and the second driver IC is between about 10 mm and about 14 mm.

3. The device of claim 1, wherein the user interface device comprises at least a button, a speaker, a microphone, a camera, or any combination thereof.

4. The device of claim 1, wherein the first driver IC and the second driver IC are generally symmetrically disposed about a longitudinal central axis of the LCD.

5. The device of claim 1, wherein the first driver IC and the second driver IC are mounted directly to the LCD without an intervening flex tape.

6. The device of claim 1, wherein the first driver IC is a master driver IC and the second driver IC is a slave driver IC.

7. The device of claim 1, when the first driver IC is electrically connected to the second driver IC by a plurality of inter-driver bus traces.

8. The device of claim 7, wherein the plurality of inter-driver bus traces are formed on the LCD.

9. The device of claim 1, wherein the LCD comprises an amorphous silicon LCD.

10. The device of claim 1, comprising:
    a processor coupled to the LCD;
    memory coupled to the processor;
    a power source coupled to the processor; and
    a network device coupled to the processor.

11. The device of claim 1, comprising a second driver IC and a third driver IC both coupled to the first driver IC through an inter-driver bus.

12. The device of claim 11, wherein the first driver IC, the second driver IC, and the third driver IC are disposed near the same side of the LCD.

13. A device, comprising:
    an LCD;
    a master driver IC mounted to the LCD;
    a slave driver IC mounted to the LCD, wherein the slave driver IC is in communication with the master driver IC through an inter-driver bus, wherein the master driver IC and slave driver IC are disposed near a side of the LCD and near non-central portions of the side; and
    a user interface device disposed between the master driver IC and slave driver IC.

14. The device of claim 13, wherein the user interface device comprises at least a button, a speaker, a microphone, a camera, or any combination thereof.

15. The device of claim 13, wherein the master driver IC is coupled to a flex cable and the slave driver IC is in communication with the flex cable via the master driver IC.

* * * * *